United States Patent
Kaneko et al.

(10) Patent No.: US 9,144,903 B2
(45) Date of Patent: Sep. 29, 2015

(54) SERVO TRANSFER FEEDER AND METHOD FOR CONTROLLING SERVO TRANSFER FEEDER

(71) Applicant: AIDA ENGINEERING, LTD., Sagamihara-shi, Kanagawa (JP)

(72) Inventors: Sotoyuki Kaneko, Sagamihara (JP); Ken Fujita, Machida (JP)

(73) Assignee: AIDA ENGINEERING, LTD., Kanagawa (JP)

( * ) Notice: Subject to any disclaimer, the term of this patent is extended or adjusted under 35 U.S.C. 154(b) by 0 days.

(21) Appl. No.: 14/295,944

(22) Filed: Jun. 4, 2014

(65) Prior Publication Data
US 2014/0364997 A1    Dec. 11, 2014

(30) Foreign Application Priority Data
Jun. 6, 2013 (JP) .................. 2013-119643

(51) Int. Cl.
| | |
|---|---|
| *G06F 7/00* | (2006.01) |
| *B25J 9/16* | (2006.01) |
| *B21D 43/05* | (2006.01) |
| *G05B 19/418* | (2006.01) |
| *B21D 43/10* | (2006.01) |

(52) U.S. Cl.
CPC .............. *B25J 9/1664* (2013.01); *B21D 43/05* (2013.01); *B21D 43/105* (2013.01); *G05B 19/41815* (2013.01); *G05B 2219/39105* (2013.01); *G05B 2219/43174* (2013.01); *G05B 2219/45142* (2013.01); *G05B 2219/50233* (2013.01)

(58) Field of Classification Search
None
See application file for complete search history.

(56) References Cited

U.S. PATENT DOCUMENTS

| | | | |
|---|---|---|---|
| 6,382,400 | B1 | 5/2002 | Hofele et al. |
| 2004/0154161 | A1* | 8/2004 | Aoyama et al. ................. 29/739 |
| 2008/0109105 | A1 | 5/2008 | Weber et al. |
| 2008/0295564 | A1 | 12/2008 | Kaneko et al. |

FOREIGN PATENT DOCUMENTS

| | | |
|---|---|---|
| EP | 2144128 A2 | 1/2010 |
| JP | 05-90386 A | 4/1993 |
| JP | 2004-255417 A | 9/2004 |
| JP | 2004-255419 A | 9/2004 |
| JP | 2006-122986 A | 5/2006 |
| JP | 2006-314159 A | 11/2006 |
| JP | 2011-131290 A | 7/2011 |
| JP | 2013-003693 A | 1/2013 |

OTHER PUBLICATIONS

European Search Report EP 14 00 1910.0-1807 dated Oct. 14, 2014.

* cited by examiner

*Primary Examiner* — Yolanda Cumbess
(74) *Attorney, Agent, or Firm* — McDermott Will & Emery LLP (57) ABSTRACT

A servo transfer feeder is configured to transfer a workpiece that is held by a holding member between an upstream press and a downstream press, and includes a storage section that stores a basic cam curve, a maximum velocity, and a maximum acceleration, a moving time calculation section that respectively calculates different moving times as to the moving distance of the holding member by limiting the basic cam curve respectively to the maximum velocity and the maximum acceleration, and a cam curve generation section that generates a motion cam curve by reflecting the moving distance and a longer one of the different moving times to the basic cam curve. The holding member moves between the upstream press and the downstream press, based on the motion cam curve.

16 Claims, 7 Drawing Sheets

SERVO TRANSFER FEEDER AND METHOD FOR CONTROLLING SERVO TRANSFER FEEDER

Japanese Patent Application No. 2013-119643 filed on Jun. 6, 2013 is hereby incorporated by reference in its entirety.

BACKGROUND OF THE INVENTION

The present invention relates to a servo transfer feeder that is used for a press line, and a method for controlling a servo transfer feeder.

A transfer press line includes a plurality of presses that are provided with an upper die and a lower die, and a transfer feeder that transfers the workpiece from the upstream press to the downstream press. The transfer press line can achieve high productivity and save space by successively performing a plurality of press steps (e.g., punching, bending, and drawing).

A servo transfer feeder has been increasingly used as the transfer feeder included in the transfer press line instead of a mechanical transfer feeder. The servo transfer feeder contributes to an improvement in performance of the press line since various transfer motions can be easily set and changed.

For example, the moving distance of the lift motion of the servo transfer feeder can be set corresponding to the workpiece to have a minimum value at which interference of the workpiece with the lower die can be prevented. When implementing shallow drawing, the workpiece can be transferred at high speed by reducing the moving distance of the lift motion of the servo transfer feeder. When implementing deep drawing, a product provided with a high degree of drawing can be lifted, and the workpiece can be transferred at a stable speed by increasing the moving distance of the lift motion of the servo transfer feeder. When the height at which the workpiece is placed on the die differs between the upstream press and the downstream press, the workpiece can be transferred at an optimum height by appropriately adjusting the workpiece hold/release position of the servo transfer feeder. According to the servo transfer feeder, the production efficiency of the transfer press line can be improved by appropriately selecting a transfer motion optimum for the press conditions of the transfer press line.

It is important to appropriately set a transfer motion optimum for the press conditions.

For example, JP-A-2004-255417 ("Feeder teaching motion setting method") discloses a method that sets the positions of twelve teaching points to generate a transfer motion. According to the transfer motion generation method disclosed in JP-A-2004-255417, since the speed of synthesis between the adjacent teaching points can be easily set within the possible range, the number of operations for setting the transfer motion can be reduced, and operability can be improved.

JP-A-2011-131290 ("Transfer path setting method") discloses a method that automatically sets the workpiece transfer path corresponding to the shape of the die. According to the transfer motion generation method disclosed in JP-A-2011-131290, the calculation time required to set the transfer path can be significantly reduced by automatically calculating the transfer path using CAD data based on lower die/upper die shape data.

Since the transfer path setting method disclosed in JP-A-2011-131290 automatically calculates the transfer path using CAD data based on lower die/upper die shape data, it is possible to prevent unstable transfer that may occur when using the method disclosed in JP-A-2004-255417.

JP-A-5-90386 ("Transfer device") discloses a method that reduces vibrations and impact applied to the transfer target object by driving a motor according to a cam curve when transferring the transfer target object by driving a direct drive motor.

SUMMARY

Several aspects of the invention may provide a servo transfer feeder and a method for controlling a servo transfer feeder that can simplify the transfer motion setting operation while achieving stable workpiece transfer.

According to a first aspect of the invention, there is provided a servo transfer feeder configured to transfer a workpiece between an upstream press and a downstream press, the workpiece being held by a holding member, the servo transfer feeder including:

a storage section that stores a basic cam curve, a maximum velocity, and a maximum acceleration, the basic cam curve having been generated so that a moving time and a moving distance can be arbitrarily set, and a velocity and an acceleration of the holding member at a starting point and an end point are 0, and the maximum velocity and the maximum acceleration being set as motion limit values when the holding member moves;

a motion condition input section that sets the moving distance when the holding member performs each motion among a first lift motion, an advance motion, a first down motion, a second lift motion, a return motion, and a second down motion;

a moving time calculation section that calculates a first moving time of each motion while limiting the basic cam curve at the moving distance of each motion set by the motion condition input section using the maximum velocity, and calculates a second moving time of each motion while limiting the basic cam curve at the moving distance of each motion set by the motion condition input section using the maximum acceleration;

a cam curve generation section that compares the first moving time with the second moving time to select the first moving time or the second moving time, whichever is longer, and inputs the selected moving time and the moving distance of each motion to the basic cam curve to generate a motion cam curve of each motion;

a transfer motion generation section that combines at least six motion cam curves that have been generated by the cam curve generation section to generate a transfer motion; and an output section that outputs a position instruction relating to the holding member based on the transfer motion.

According to a second aspect of the invention, there is provided a method for controlling a servo transfer feeder configured to transfer a workpiece between an upstream press and a downstream press, the workpiece being held by a holding member, the method including:

providing a basic cam curve, a maximum velocity, and a maximum acceleration, the basic cam curve having been generated so that a moving time and a moving distance can be arbitrarily set, and a velocity and an acceleration of the holding member at a starting point and an end point are 0, and the maximum velocity and the maximum acceleration being set as motion limit values when the holding member moves;

setting the moving distance when the holding member performs each motion among a first lift motion, an advance motion, a first down motion, a second lift motion, a return motion, and a second down motion;

calculating a first moving time of each motion while limiting the basic cam curve at the set moving distance of each motion using the maximum velocity;

calculating a second moving time of each motion while limiting the basic cam curve at the set moving distance of each motion using the maximum acceleration;

comparing the first moving time with the second moving time to select the first moving time or the second moving time, whichever is longer, and inputting the selected moving time and the moving distance of each motion to the basic cam curve to generate a motion cam curve of each motion;

combining at least six motion cam curves that have been generated to generate a transfer motion; and outputting a position instruction based on the transfer motion to move the holding member between the upstream press and the downstream press.

According to a third aspect of the invention, there is provided a servo transfer feeder configured to transfer a workpiece between an upstream press and a downstream press, the workpiece being held by a holding member, the servo transfer feeder including:

a storage section that stores a basic cam curve in which the moving time and a moving distance of the holding member may be arbitrarily set between the upstream press and the downstream press, a maximum velocity, and a maximum acceleration, the maximum velocity and the maximum acceleration being set as motion limit values when the holding member moves;

a moving time calculation section that respectively calculates different moving times in length as to the moving distance, with the basic cam curve limited by the maximum velocity and the maximum acceleration; and a cam curve generation section that generates a motion cam curve as to the moving distance with the moving distance and a longer one of the different moving times reflected to the basic cam curve, wherein the holding member moves between the upstream press and the downstream press in accordance with the motion cam curve.

DETAILED DESCRIPTION OF THE EMBODIMENT

According to one embodiment of the present disclosure, a servo transfer feeder transfers a workpiece between an upstream press and a downstream press, the workpiece being held by a holding member, the servo transfer feeder including:

a storage section that stores a basic cam curve, a maximum velocity, and a maximum acceleration, the basic cam curve having been generated so that a moving time and a moving distance can be arbitrarily set, and a velocity and an acceleration of the holding member at a starting point and an end point are 0, and the maximum velocity and the maximum acceleration being set as motion limit values when the holding member moves;

a motion condition input section that sets the moving distance when the holding member performs each motion among a first lift motion, an advance motion, a first down motion, a second lift motion, a return motion, and a second down motion;

a moving time calculation section that calculates a first moving time of each motion while limiting the basic cam curve at the moving distance of each motion set by the motion condition input section using the maximum velocity, and calculates a second moving time of each motion while limiting the basic cam curve at the moving distance of each motion set by the motion condition input section using the maximum acceleration;

a cam curve generation section that compares the first moving time with the second moving time to select the first moving time or the second moving time, whichever is longer, and inputs the selected moving time and the moving distance of each motion to the basic cam curve to generate a motion cam curve of each motion;

a transfer motion generation section that combines at least six motion cam curves that have been generated by the cam curve generation section to generate a transfer motion; and an output section that outputs a position instruction relating to the holding member based on the transfer motion.

According to the servo transfer feeder, it is possible to stably transfer the workpiece during each motion by generating the motion cam curves corresponding to the six motions. It is also possible to simplify the transfer motion setting operation by generating the motion cam curves corresponding to the six motions.

According to one embodiment of the present disclosure, a method for controlling a servo transfer feeder that transfers a workpiece between an upstream press and a downstream press, the workpiece being held by a holding member, includes:

providing a basic cam curve, a maximum velocity, and a maximum acceleration, the basic cam curve having been generated so that a moving time and a moving distance can be arbitrarily set, and a velocity and an acceleration of the holding member at a starting point and an end point are 0, and the maximum velocity and the maximum acceleration being set as motion limit values when the holding member moves;

setting the moving distance when the holding member performs each motion among a first lift motion, an advance motion, a first down motion, a second lift motion, a return motion, and a second down motion;

calculating a first moving time of each motion while limiting the basic cam curve at the set moving distance of each motion using the maximum velocity;

calculating a second moving time of each motion while limiting the basic cam curve at the set moving distance of each motion using the maximum acceleration;

comparing the first moving time with the second moving time to select the first moving time or the second moving time, whichever is longer, and inputting the selected moving time and the moving distance of each motion to the basic cam curve to generate a motion cam curve of each motion;

combining at least six motion cam curves that have been generated to generate a transfer motion; and outputting a position instruction based on the transfer motion to move the holding member between the upstream press and the downstream press.

According to the method for controlling a servo transfer feeder, it is possible to stably transfer the workpiece during each motion by generating the motion cam curves corresponding to the six motions. It is also possible to simplify the transfer motion setting operation by generating the motion cam curves corresponding to the six motions.

According to one embodiment of the present disclosure, a servo transfer feeder transfers a workpiece between an upstream press and a downstream press, the workpiece being held by a holding member, the servo transfer feeder including:

a storage section that stores a basic cam curve in which the moving time and a moving distance of the holding member may be arbitrarily set between the upstream press and the downstream press, a maximum velocity, and a maximum acceleration, the maximum velocity and the maximum acceleration being set as motion limit values when the holding member moves;

a moving time calculation section that respectively calculates different moving times in length as to the moving distance, with the basic cam curve limited by the maximum velocity and the maximum acceleration; and a cam curve generation section that generates a motion cam curve as to the moving distance with the moving distance and a longer one of the different moving times reflected to the basic cam curve, wherein the holding member moves between the upstream press and the downstream press in accordance with the motion cam curve.

According to the servo transfer feeder, it is possible not only to stably transfer the workpiece between the upstream press and the downstream press but also to implement the efficient transfer of the workpiece.

The embodiments of the present disclosure are described below in detail with reference to the drawings.

Figure 1:
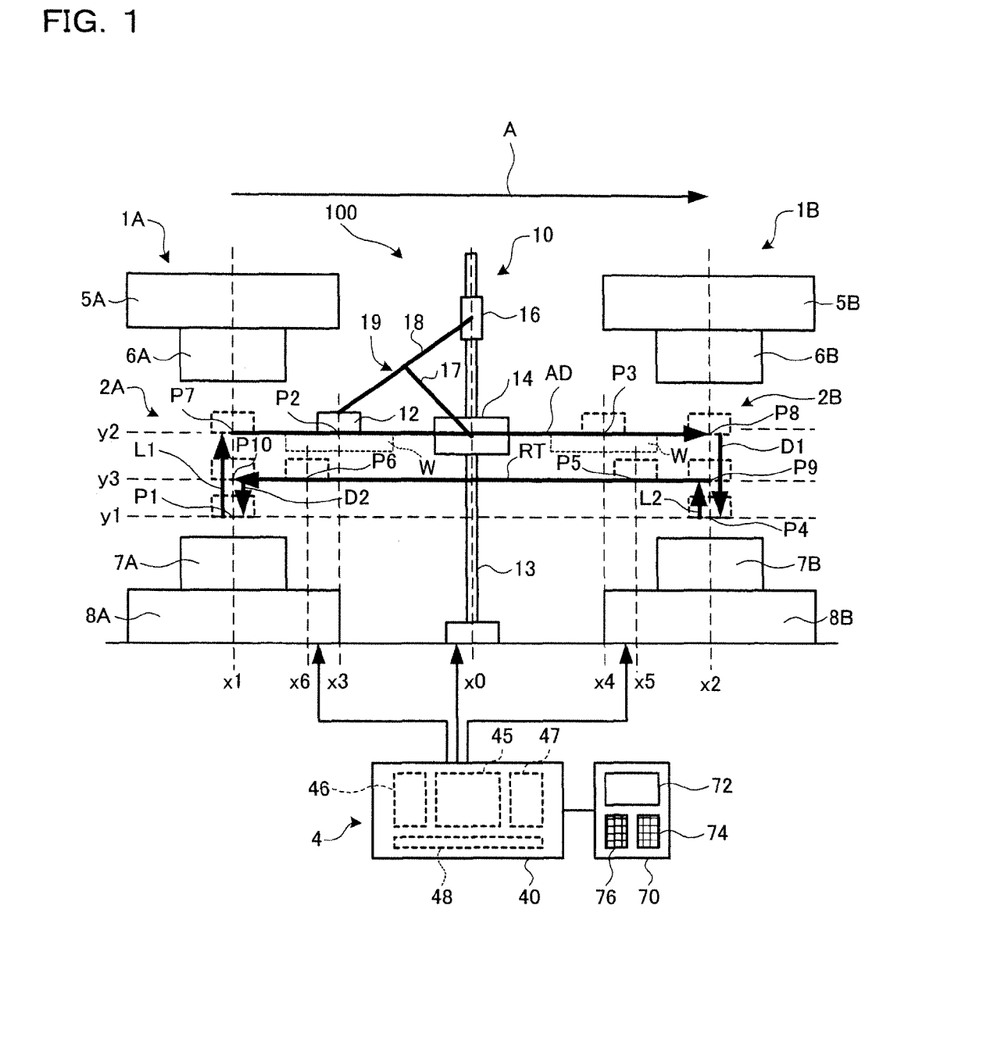
FIG. 1 is a diagram illustrating an overall configuration of a press line that utilizes a servo transfer feeder according to one embodiment of the present disclosure.
Figure 2:
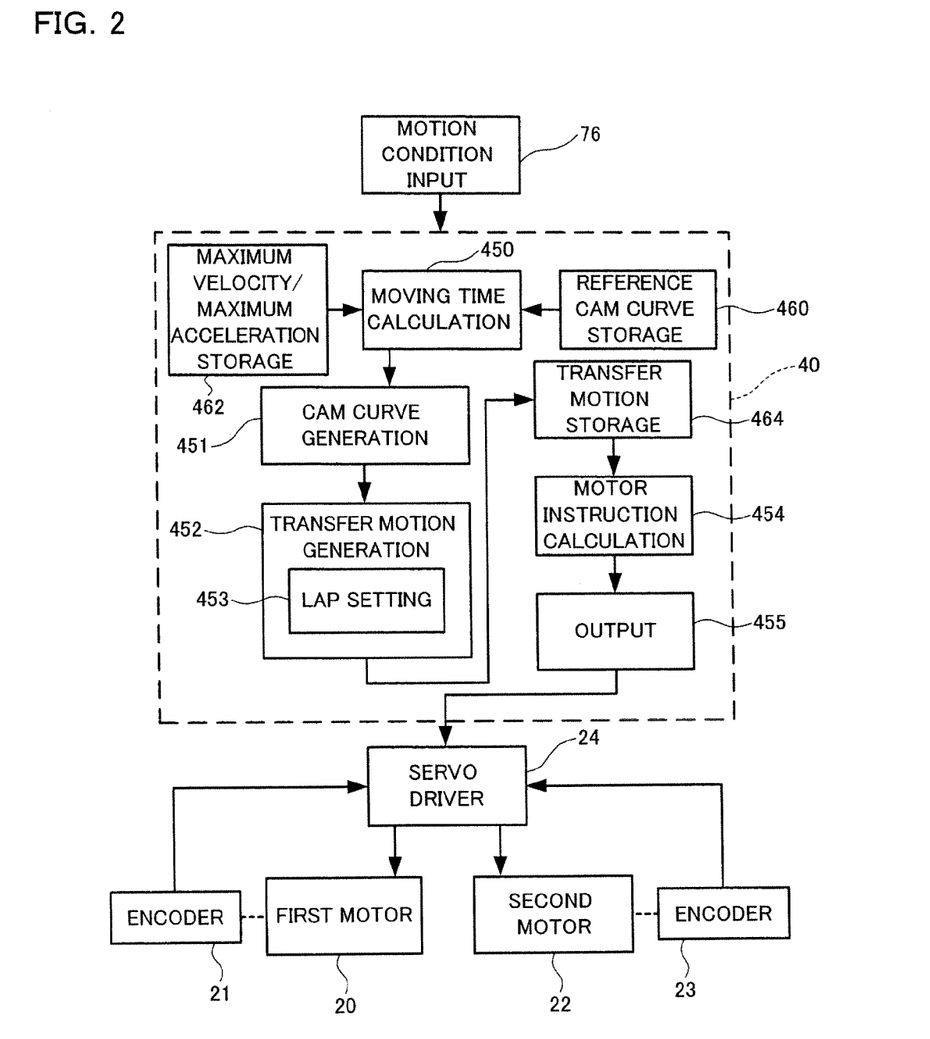
FIG. 2 is a block diagram illustrating the configuration of a controller of a servo transfer feeder according to one embodiment of the present disclosure.

FIG. 1 is a diagram illustrating an overall configuration of a press line 100 that utilizes a servo transfer feeder 10 according to one embodiment of the present disclosure. FIG. 2 is a block diagram illustrating the configuration of a controller of the servo transfer feeder according to one embodiment of the present disclosure.

As illustrated in FIG. 1, the press line 100 includes an upstream press 1A, a downstream press 1B, the servo transfer feeder 10 that is disposed between the upstream press 1A and the downstream press 1B, and a control device 4 that controls the upstream press 1A, the downstream press 1B, and the servo transfer feeder 10. Although FIG. 1 illustrates an example in which the press line 100 includes two presses and one servo transfer feeder 10, the configuration of the press line 100 is not limited thereto. For example, the press line 100 may include a plurality of presses, and a plurality of servo transfer feeders that transfer a workpiece W between the presses in the same manner as a normal press line.

In FIG. 1, the frame of the upstream press 1A and the frame of the downstream press 1B are omitted.

The press line 100 is configured so that the workpiece W (e.g., sheet-like workpiece) (not illustrated at a first position P1, a fourth position P4, a seventh position P7, and an eighth position P8) that has been pressed by the upstream press 1A is transferred to the downstream press 1B by the servo transfer feeder 10, and pressed by the downstream press 1B to have a predetermined shape to produce a product. A given press step is assigned to each of the upstream press 1A and the downstream press 1B, and is sequentially performed in a transfer direction A (i.e., the rightward direction in FIG. 1). A first die consists of an upper die 6A (first upper die) that is secured on the lower side of a slide 5A of the upstream press 1A, and a lower die 7A (first lower die) that is secured on the upper side of a bolster 8A of the upstream press 1A. A second die consists of an upper die 6B (second upper die) that is secured on the lower side of a slide 5B of the downstream press 1B, and a lower die 7B (second lower die) that is secured on the upper side of a bolster 8B of the downstream press 1B.

The upstream press 1A and the downstream press 1B basically have an identical configuration. The lower die 7A is disposed on the bolster 8A that is secured on the lower part of the frame (not illustrated in FIG. 1), and the lower die 7B is disposed on the bolster 8B that is secured on the lower part of the frame (not illustrated in FIG. 1). The slide 5A that is provided with the upper die 6A is disposed above the lower die 7A with a press space 2A interposed therebetween so that the slide 5A can move upward and downward relative to the lower die 7A, and the slide 5B that is provided with the upper die 6B is disposed above the lower die 7B with a press space 2B interposed therebetween so that the slide 5B can move upward and downward relative to the lower die 7B. The slide 5A is moved upward and downward by a drive mechanism that is provided to the upper part of the frame (not illustrated in FIG. 1) of the upstream press 1A, and the slide 5B is moved upward and downward by a drive mechanism that is provided to the upper part of the frame (not illustrated in FIG. 1) of the upstream press 1B.

The servo transfer feeder 10 is disposed between the upstream press 1A and the downstream press 1B, and transfers a holding member 12 that holds the workpiece W to or from the press space 2A of the upstream press 1A or the press space 2B of the downstream press 1B. The servo transfer feeder 10 includes a base 14, a slider 16, and a link mechanism 19, the base 14 and the slider 16 being able to move upward and downward along a support rod 13, and the link mechanism 19 including a first arm 17 and a second arm 18 that move the slider 16 and the holding member 12 relative to the base 14.

The base 14 is moved upward and downward along the support rod 13 using a first motor (not illustrated in FIG. 1), and the holding member 12 that is connected to the base 14 through the link mechanism 19 moves upward and downward in synchronization with the upward/downward movement of the base 14. A second motor (not illustrated in FIG. 1) is provided to the base 14, and one end of the first arm 17 can be rotated by driving the second motor.

The link mechanism 19 is configured so that one end of the first arm 17 is rotated by driving the second motor to move the second arm 18 that is rotatably connected to the other end of the first arm 17, and move the slider 16 that is provided to one end of the second arm 18 along the support rod 13 so that the holding member 12 that is provided to the other end of the second arm 18 is moved horizontally between the upstream press 1A and the downstream press 1B.

The servo transfer feeder 10 can move the holding member 12 between the upstream press 1A and the downstream press 1B through six basic motions L1, AD, D1, L2, RT, and D2 indicated by the arrows in FIG. 1.

Specifically, the holding member 12 receives the pressed workpiece W from the lower die 7A of the upstream press 1A at the first position P1, performs a first lift motion L1 that moves upward toward the upper die 6A, an advance motion AD that transfers the workpiece W from a position under the upper die 6A of the upstream press 1A to a position under the upper die 6B of the downstream press 1B along the transfer direction A, and a first down motion D1 that moves downward toward the lower die 7B of the downstream press 1B at a position under the upper die 6B, and releases the workpiece W on the lower die 7B to complete the workpiece transfer operation.

The holding member 12 that has released the workpiece W and become empty performs a second lift motion L2 that moves upward from the lower die 7B of the downstream press 1B toward the upper die 6B, a return motion RT that returns to a position under the upper die 6A of the upstream press 1A from a position under the upper die 6B of the downstream press 1B along the direction opposite to the transfer direction A, and a second down motion D2 that moves downward toward the lower die 7A of the upstream press 1A at a position under the upper die 6A. The holding member 12 thus returns to the first position P1.

Although an example in which the servo transfer feeder 10 includes the link mechanism 19 that utilizes two servomotors has been described above, the configuration of the servo transfer feeder 10 is not limited thereto. A known servo transfer feeder mechanism used for a press line may be employed. In one embodiment of the present disclosure, the first position P1 along the motion path of the holding member 12 is set corresponding to the lower end of the main body of the holding member 12 at the center of the main body in a plan view, for example. Note that each position may be arbitrarily set corresponding to the shape of the workpiece W and the shape of the holding member 12. Note that the expression "in a plan view" used herein refers to a case where the press line 100 is viewed from above.

Since the residence time of the holding member 12 or the workpiece W held by the holding member 12 in the press space 2A of the upstream press 1A or the press space 2B of the downstream press 1B affects the press cycle time of the press line 100 to a large extent, the servo transfer feeder 10 must quickly transfer the holding member 12 or the workpiece W held by the holding member 12 to and from the press space 2A of the upstream press 1A or the press space 2B of the downstream press 1B. Since the holding member 12 normally holds the workpiece W using a vacuum cup (not illustrated in FIG. 1), the holding member 12 must stably transfer the workpiece W so that the workpiece W does not fall from the holding member 12 due to air resistance during transfer or an inertial force during deceleration/acceleration. Therefore, the maximum velocity and the maximum acceleration are set to the servo transfer feeder 10 as motion limit values during transfer. The highest velocity and the highest acceleration within a range in which the workpiece W does not fall from the holding member 12 are respectively set to be the maximum velocity and the maximum acceleration, and stored in a nonvolatile memory 46 of the control device 4.

The control device 4 controls the upstream press 1A, the downstream press 1B, and the servo transfer feeder 10 included in the press line 100 in synchronization. The control device 4 includes a controller 40, and an operation panel 70 for operating the controller 40. The controller 40 may include a control section 45 that includes a CPU, the nonvolatile memory 46 (storage section) that stores a program, the transfer conditions, and the like, a memory 47 that temporarily stores part of a program that is being executed, and motion data, and an interface 48. The operation panel 70 may include a display section 72, an operation section 74 for operating the upstream press 1A, the downstream press 1B, and the servo transfer feeder 10, and a motion condition input section 76 for inputting various motion conditions (e.g., motion start position and moving distance).

As illustrated in FIG. 2, the controller 40 may include a reference cam curve storage section 460, a maximum velocity/maximum acceleration storage section 462, a moving time calculation section 450, a cam curve generation section 451, a transfer motion generation section 452 that includes a lap setting section 453, a transfer motion storage section 464, a motor instruction calculation section 454, and an output section 455. The reference cam curve storage section 460, the maximum velocity/maximum acceleration storage section 462, and the transfer motion storage section 464 are included in the nonvolatile memory 46. The moving time calculation section 450, the cam curve generation section 451, the transfer motion generation section 452, the motor instruction calculation section 454, and the output section 455 are included in the control section 45.

A basic cam curve stored in the reference cam curve storage section 460 is generated so that the moving time and the moving distance can be arbitrarily set, and the velocity and the acceleration of the holding member 12 at the starting point and the end point are 0. The basic cam curve is a dwell-rise-dwell cam curve. For example, a cycloidal curve, a modified sine curve, an algebraic polynomial curve (e.g., a 5th order polynomial curve), or the like may be used. In one embodiment of the present disclosure, a 5th order polynomial curve is used. Therefore, it is desirable that each motion start from a stationary state, gradually increase in velocity and acceleration, reach the peak velocity and the peak acceleration at the halfway point of the moving distance, gradually decrease in velocity and acceleration, and gradually stop at the end point.

The maximum velocity/maximum acceleration storage section 462 stores the maximum velocity and the maximum acceleration that have been set as the motion limit values when the holding member 12 moves. The maximum velocity and the maximum acceleration may be set within a range which is close to the specification limitation value of the servo transfer feeder 10, and in which the workpiece can be reliably transferred. It is possible to generate a transfer motion that can achieve high productivity while ensuring stable workpiece transfer by operating the servo transfer feeder 10 within a range in which the maximum velocity and the maximum acceleration are not exceeded.

The motion condition input section 76 sets the moving distance when the holding member 12 performs each motion among the first lift motion L1, the advance motion AD, the first down motion D1, the second lift motion L2, the return motion RT, and the second down motion D2. The motion condition input section 76 may set the first position P1, the second position P2, the third position P3, and the fourth position P4 through which the holding member 12 passes along the motion path in which the workpiece W is transferred from the upstream press 1A to the downstream press 1B, and set the fifth position P5 and the sixth position P6 through which the holding member 12 passes along the motion path in which the holding member 12 is transferred from the downstream press 1B to the upstream press 1A, in order to set the moving distance when the holding member 12 performs each motion.

The first position P1 may be the motion start position of the first lift motion L1, and the motion end position of the second down motion D2. The first position P1 may be the position of the workpiece W (not illustrated in FIG. 1 at the first position P1) on the first lower die 7A that is secured on the first bolster 8A of the upstream press 1A in a plan view, and the position in the vertical direction at which the holding member 12 starts to hold the workpiece W on the first lower die 7A. The position at which the holding member 12 starts to hold the workpiece W refers to the position at which a vacuum cup sucks the workpiece W when the holding member 12 holds the workpiece W using a vacuum cup, or the position at which a grip mechanism grips the workpiece W when the holding member 12 holds the workpiece W using a grip mechanism.

The second position P2 may be the position which is situated on the side of the upstream press 1A and through which the holding member 12 passes during the advance motion AD, and may be situated at a height at which the workpiece W does not interfere with the first lower die 7A of the upstream press 1A. The second position P2 may be the position of the holding member 12 when the end of the workpiece W that is situated on the side of the upstream press 1A overlaps the end of the first lower die 7A that is situated on the side of the downstream press 1B in a plan view.

The third position P3 may be the position which is situated on the side of the downstream press 1B and through which the holding member 12 passes during the advance motion AD, and may be situated at a height at which the workpiece W does not interfere with the second lower die 7B of the downstream press 1B. The third position P3 may be the position of the holding member 12 when the end of the workpiece W that is situated on the side of the downstream press 1B overlaps the end of the second lower die 7B that is situated on the side of the upstream press 1A in a plan view.

The fourth position P4 may be the motion end position of the first down motion D1, and the motion start position of the second lift motion L2. The fourth position P4 may be the position at which the holding member 12 releases the workpiece W (not illustrated in FIG. 1 at the fourth position P4) on the second lower die 7B.

The fifth position P5 may be the position which is situated on the side of the downstream press 1B and through which the holding member 12 passes during the return motion RT, and may be situated at a height at which the holding member 12 does not interfere with the second lower die 7B. The fifth position P5 may be the position of the holding member 12 when the end of the holding member 12 that is situated on the side of the downstream press 1B overlaps the end of the second lower die 7B that is situated on the side of the upstream press 1A in a plan view.

The sixth position P6 may be the position which is situated on the side of the upstream press 1A and through which the holding member 12 passes during the return motion RT, and may be situated at a height at which the holding member 12 does not interfere with the first lower die 7A. The sixth position P6 may be the position of the holding member 12 when the end of the holding member 12 that is situated on the side of the upstream press 1A overlaps the end of the first lower die 7A that is situated on the side of the downstream press 1B in a plan view.

It is possible to avoid interference of the holding member 12 and the workpiece W with the lower die 7A and the lower die 7B by setting the second position P2, the third position P3, the fifth position P5, and the sixth position P6 as described above in a plan view. Specifically, the area between the second position P2 and the third position P3, and the area between the fifth position P5 and the sixth position P6 are non-interference areas in which interference of the holding member 12 and the workpiece W with the lower die 7A and the lower die 7B substantially need not be taken into consideration.

The moving time calculation section 450 calculates a first moving time of each motion while limiting the basic cam curve at the moving distance of each motion set by the motion condition input section 76 using the maximum velocity, and calculates a second moving time of each motion while limiting the basic cam curve at the moving distance of each motion set by the motion condition input section 76 using the maximum acceleration.

The cam curve generation section 451 compares the first moving time with the second moving time to select the first moving time or the second moving time, whichever is longer, and inputs the selected moving time and the moving distance of each motion to the basic cam curve to generate a motion cam curve of each motion.

The process that calculates the first moving time and the second moving time (performed by the moving time calculation section 450), and the process that generates the motion cam curve of each motion (performed by the cam curve generation section 451) are described below with reference to FIGS. 3 and 4 taking the advance motion AD as an example.

Figure 3:
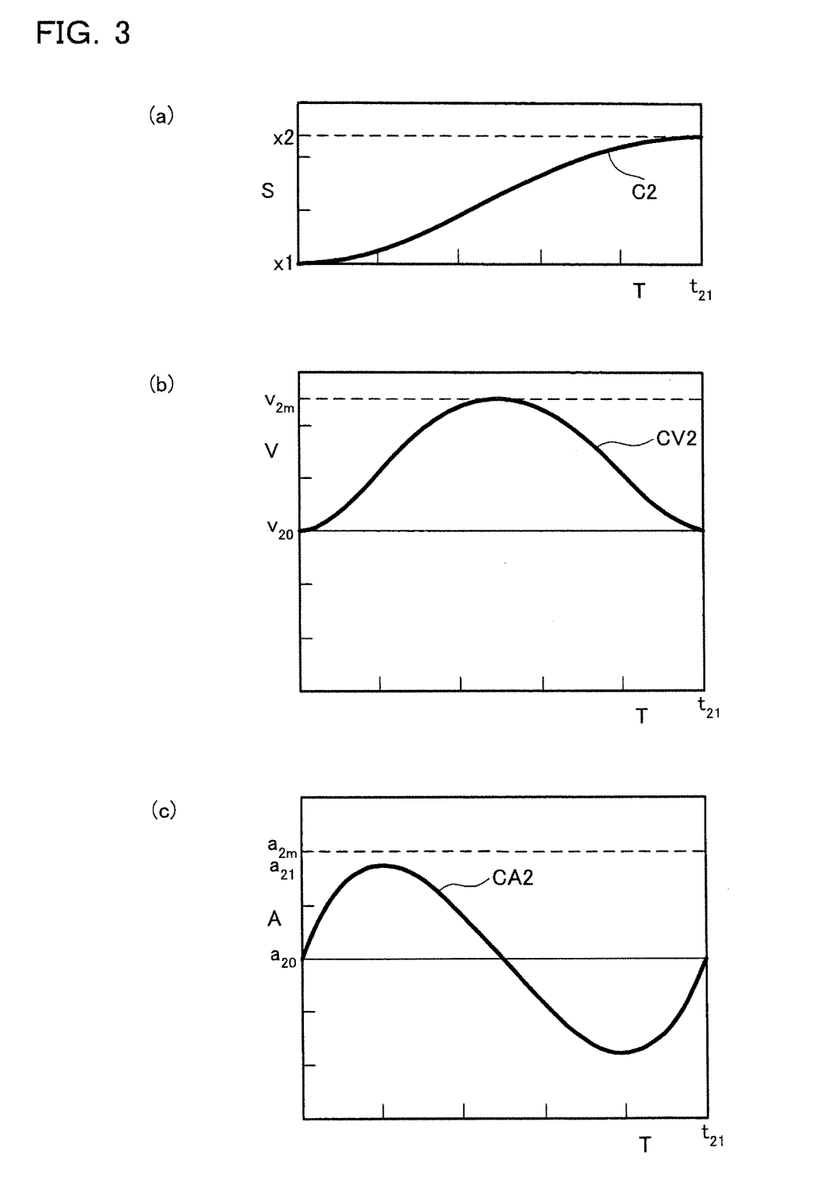
FIG. 3 illustrates motion cam curves generated by a servo transfer feeder according to one embodiment of the present disclosure, and limited by the maximum velocity.

FIG. 3 illustrates motion cam curves C2, CV2, and CA2 that are generated by the servo transfer feeder 10 according to one embodiment of the present disclosure, and limited by a maximum velocity $v_{2m}$. FIG. 4 illustrates motion cam curves C20, CV20, and CA20 that are generated by the servo transfer feeder 10 according to one embodiment of the present disclosure, and limited by a maximum acceleration atm. In (a) in FIG. 3 and (a) in FIG. 4, the horizontal axis indicates the time T of the advance motion AD, and the vertical axis indicates the shift S of the holding member 12. In (b) in FIG. 3 and (b) in FIG. 4 (obtained by differentiating the time (T)-shift (S) cam curve in (a)), the horizontal axis indicates the time T of the advance motion AD, and the vertical axis indicates the velocity V of the holding member 12. In (c) in FIG. 3 and (c) in FIG. 4 (obtained by differentiating the time (T)-velocity (V) cam curve in (b)), the horizontal axis indicates the time T of the advance motion AD, and the vertical axis indicates the acceleration A of the holding member 12. Specifically, (a), (b), and (c) in FIG. 3 correspond to an identical cam curve, and (a), (b), and (c) in FIG. 4 correspond to an identical cam curve. In FIGS. 3 and 4, the unit for the time T is sec (seconds), the unit for the shift S is m (meters), the unit for the velocity V is m/sec, and the unit for the acceleration A is m/sec².

The moving distance of the advance motion AD set by the motion condition input section 76 is the horizontal distance between the first position P1 at which the holding member 12 starts to hold the workpiece W that has been pressed by the upstream press 1A and is positioned on the first lower die 7A, and the fourth position P4 at which the workpiece W is placed on the second lower die 7B of the downstream press 1B (i.e., the horizontal moving distance of the holding member 12 from the seventh position P7 to the eighth position P8), and is input to the basic cam curve. The seventh position P7 is situated vertically above the first position P1 at the same height as that of the second position P2. The eighth position P8 is situated vertically above the fourth position P4 at the same height as that of the third position P3.

The basic cam curve is limited by the maximum velocity $v_{2m}$ to generate the cam curve CV2 (see (b) in FIG. 3), and a first moving time $t_{21}$ of the advance motion AD when limited by the maximum velocity $v_{2m}$ is calculated. The peak of the cam curve CV2 corresponds to the velocity $v_{2m}$.

Figure 4:
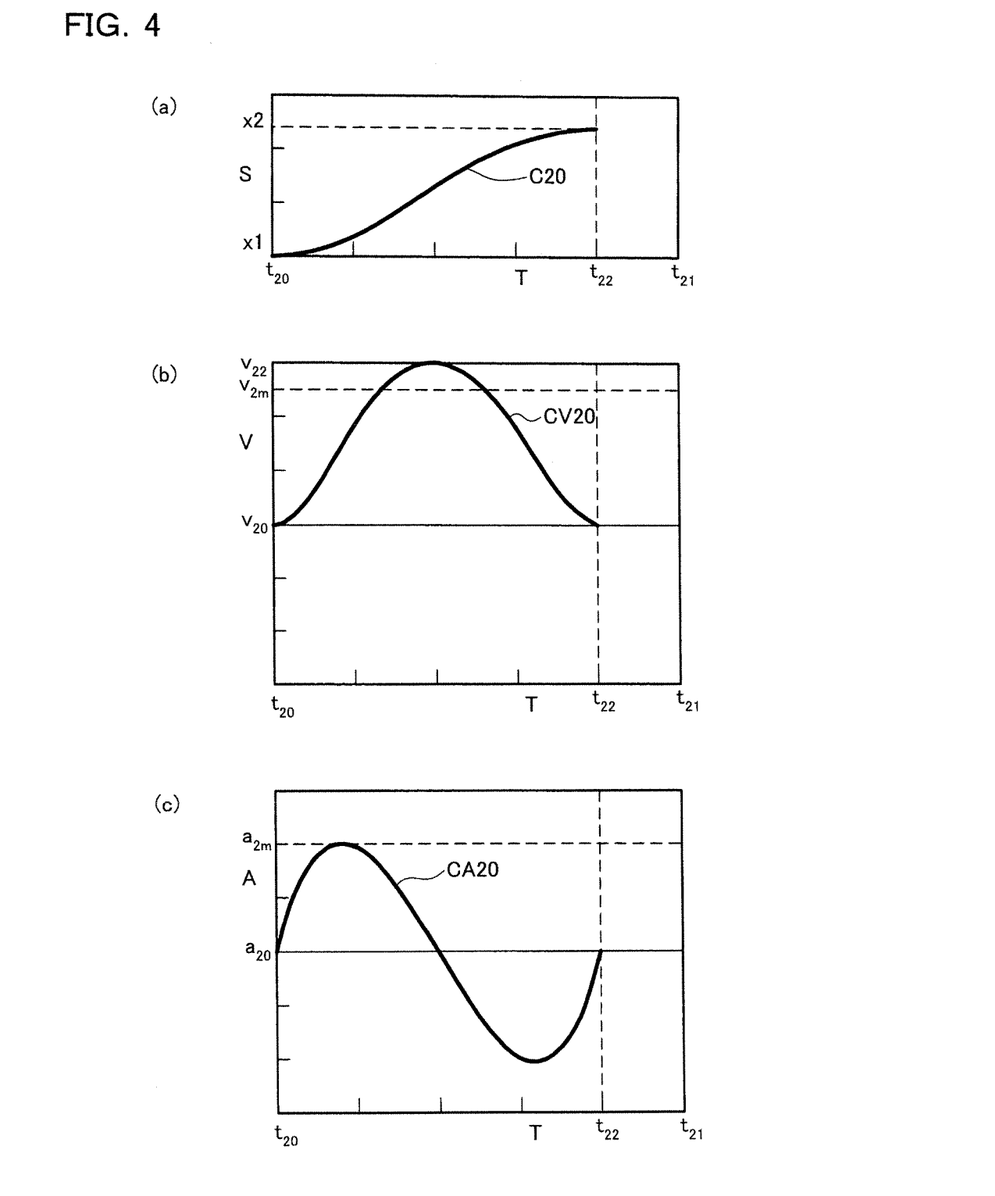
FIG. 4 illustrates motion cam curves generated by a servo transfer feeder according to one embodiment of the present disclosure, and limited by the maximum acceleration.

The basic cam curve is limited by the maximum acceleration atm to generate the cam curve CV20 (see (c) in FIG. 4), and a second moving time $t_{22}$ of the advance motion AD when limited by the maximum acceleration $a_{2m}$ is calculated. The peak of the cam curve CV20 corresponds to the acceleration $a_{2m}$.

Although an example in which the cam curves (see (b) in FIG. 3 and (c) in FIG. 4) are generated in order to calculate the first moving time $t_{21}$ and the second moving time $t_{22}$ has been described above, the moving time calculation section 450 may calculate the first moving time $t_{21}$ and the second moving time $t_{22}$ based on the basic cam curve.

The cam curve generation section 451 compares the first moving time $t_{21}$ with the second moving time $t_{22}$ to select the first moving time $t_{21}$ or the second moving time $t_{22}$, whichever is longer. In the example illustrated in FIGS. 3 and 4, the cam curve generation section 451 selects the first moving time $t_{21}$. The motion cam curve does not exceed the maximum velocity $v_{2m}$ and the maximum acceleration atm when the cam curve generation section 451 selects the first moving time $t_{21}$ or the second moving time $t_{22}$, whichever is longer. While the cam curve CV20 (second moving time $t_{22}$) exceeds the maximum velocity $v_{2m}$ (see (b) in FIG. 4), the cam curve CV2 and the cam curve CA2 (first moving time $t_{21}$) do not exceed the maximum velocity $v_{2m}$ and the maximum acceleration $a_{2m}$ (see (b) and (c) in FIG. 3). Therefore, the advance motion AD that is set to the first moving time $t_{21}$ ensures that the holding member 12 can safely transfer the workpiece W, and makes it possible to implement the most efficient transfer when using the basic cam curve.

The selected first moving time $t_{21}$ and the moving distance (x2-x1) of the advance motion AD are input to the basic cam curve to generate the second motion cam curve CV2 of the advance motion AD.

A first motion cam curve CV1, a third motion cam curve CV3, a fourth motion cam curve CV4, a fifth motion cam curve CV5, and a sixth motion cam curve CV6 are generated corresponding to the first lift motion L1, the first down motion D1, the second lift motion L2, the return motion RT, and the second down motion D2 (basic motions other than the advance motion AD) in the same manner as described above.

The transfer motion generation section 452 combines at least the first motion cam curve CV1, the second motion cam curve CV2, the third motion cam curve CV3, the fourth motion cam curve CV4, the fifth motion cam curve CV5, and the sixth motion cam curve CV6 that have been generated by the cam curve generation section 451 to generate a transfer motion M1.

Figure 5:
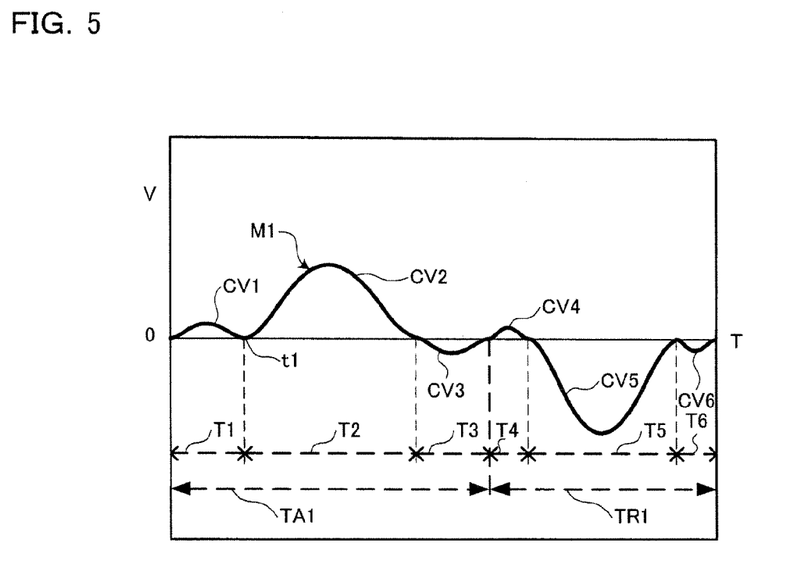
FIG. 5 illustrates a transfer motion generated by a servo transfer feeder according to one embodiment of the present disclosure.
Figure 6:
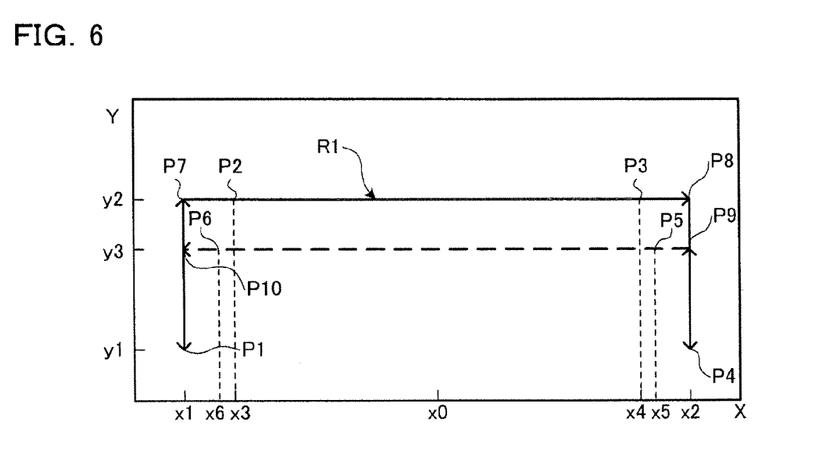
FIG. 6 illustrates the motion path of a holding member transferred by a servo transfer feeder according to one embodiment of the present disclosure.

The transfer motion M1 and a motion path R1 are described below with reference to FIGS. 5 and 6. FIG. 5 illustrates the transfer motion M1 that is generated by the servo transfer feeder 10 according to one embodiment of the present disclosure. FIG. 6 illustrates the motion path R1 of the holding member 12 that is transferred by the servo transfer feeder 10 according to one embodiment of the present disclosure.

In FIG. 5 that illustrates the transfer motion M1 generated by the transfer motion generation section 452, the horizontal axis indicates the motion time T, and the vertical axis indicates the velocity V of the holding member 12. Note that the positive velocity with respect to the horizontal axis (T) is the velocity of the motion (movement) from the upstream press 1A to the downstream press 1B, and the negative velocity with respect to the horizontal axis (T) is the velocity of the motion (movement) from the downstream press 1B to the upstream press 1A. In FIG. 5, the motion cam curves of the first lift motion L1, the advance motion AD, the first down motion D1, the second lift motion L2, the return motion RT, and the second down motion D2 are combined sequentially from left to right. Therefore, the horizontal axis (T) in FIG. 5 indicates one cycle time of the servo transfer feeder 10 according to one embodiment of the present disclosure. Note that the absolute value of the maximum velocity and the absolute value of the maximum acceleration are used in one embodiment of the present disclosure.

The leftmost first motion cam curve CV1 (i.e., the leftmost motion cam curve in FIG. 5) is the motion cam curve of the first lift motion L1 from the first position P1 to the seventh position P7 in the vertical direction. The second moving time limited by the maximum acceleration $a_{2m}$ is selected as the moving time T1, for example. The moving distance set to the first motion cam curve CV1 is y2-y1.

The second motion cam curve CV2 is the motion cam curve of the advance motion AD from the seventh position P7 to the eighth position P8 in the horizontal direction (see FIGS. 3 and 4). The first moving time limited by the maximum velocity $v_{2m}$ is selected as the moving time T2, for example. The moving distance set to the second motion cam curve CV2 is x2-x1.

The third motion cam curve CV3 is the motion cam curve of the first down motion D1 from the eighth position P8 to the fourth position P4 in the vertical direction. The second moving time limited by the maximum acceleration $a_{2m}$ is selected as the moving time T3, for example. The moving distance set to the third motion cam curve CV3 is y2-y1.

The sum of the moving time T1, the moving time T2, and the moving time T3 is an advance time TA1 required to transfer the workpiece W from the upstream press 1A to the downstream press 1B.

The fourth motion cam curve CV4 is the motion cam curve of the second lift motion L2 from the fourth position P4 to the ninth position P9 in the vertical direction. The second moving time limited by the maximum acceleration $a_{2m}$ is selected as the moving time T4, for example. The moving distance set to the fourth motion cam curve CV4 is y3-y1.

The fifth motion cam curve CV5 is the motion cam curve of the return motion RT from the ninth position P9 to the tenth position P10 in the horizontal direction. The first moving time limited by the maximum velocity $v_{2m}$ is selected as the moving time T5, for example. The moving distance set to the fifth motion cam curve CV5 is x2-x1.

The sixth motion cam curve CV6 is the motion cam curve of the second down motion D2 from the tenth position P10 to the first position P1 in the vertical direction. The second moving time limited by the maximum acceleration $a_{2m}$ is selected as the moving time T6, for example. The moving distance set to the sixth motion cam curve CV6 is y3-y1.

The sum of the moving time T4, the moving time T5, and the moving time T6 is a return time TR1 required to return the holding member 12 from the downstream press 1B to the upstream press 1A.

According to the transfer motion M1 thus obtained, it is possible to stably transfer the workpiece during each motion by generating the motion cam curve corresponding to each motion, and easily set the transfer motion M1 by generating the motion cam curves corresponding to at least six motions. Moreover, the process that sets the motion cam curves corresponding to the six basic motions, and combines the motion cam curves is comprehensible for the operator, and it is possible to set the transfer motion M1 while intuitively determining each motion from the motion cam curve.

Therefore, the transfer motion M1 prevents an unstable transfer that may occur when using the technique disclosed in JP-A-2004-255417 in which the lift/feed velocity changes at each point of connection between teaching points, and acceleration intermittently occurs at each teaching point.

FIG. 6 illustrates the motion path R1 of the holding member 12 that makes a motion according to the transfer motion M1. In FIG. 6, the horizontal axis (X) indicates the shift (unit: m (meters)) of the holding member 12 in the horizontal direction, and the vertical axis (Y) indicates the shift (unit: m (meters)) of the holding member 12 in the vertical direction. Specifically, the motion path R1 illustrated in FIG. 6 corresponds to the motion path illustrated in FIG. 1.

In FIG. 6, the fifth position P5 and the sixth position P6 are situated at a third height y3 that is lower in the vertical direction than a second height y2 at which the second position P2 and the third position P3 are situated, since the area in the vertical direction in which the holding member 12 may interfere with the lower die 7A or 7B decreases during the return motion RT during which the holding member 12 does not hold the workpiece W. The first position P1 and the fourth position P4 are situated at a first height y1.

The fifth position P5 is situated closer to the downstream press 1B in the horizontal direction as compared with the third position P3, and the sixth position P6 is situated closer to the upstream press 1A in the horizontal direction as compared with the second position P2. This is because the area in the horizontal direction in which the holding member 12 may interfere with the lower die 7A or 7B decreases during the return motion RT during which the holding member 12 does not hold the workpiece W.

The output section 455 outputs a position instruction relating to the holding member 12 based on the transfer motion M1. The position instruction output from the output section 455 is transmitted to the first motor 20 and the second motor 22 of the servo transfer feeder 10 through a servo driver 24 (see FIG. 2). For example, the position instruction relating to the upward/downward motion of the holding member 12 causes the first motor 20 to operate and move the base 14 upward/downward along the support rod 13 so that the holding member 12 moves upward/downward according to the transfer motion M1. For example, the position instruction relating to the horizontal motion (movement) of the holding member 12 causes the second motor 22 to operate and rotate the first arm 17 so that the holding member 12 moves in the horizontal direction according to the transfer motion M1.

The transfer motion M1 generated by the transfer motion generation section 452 is stored in the transfer motion storage section 464. The motor instruction calculation section 454 calculates an instruction position or an instruction angle with respect to the elapsed time from the transfer motion M1, for example. The calculation result may be stored in the nonvolatile memory 46, and output from the output section 455, for example. Since the servo transfer feeder 10 according to one embodiment of the present disclosure is configured to include the first motor 20 (servo motor) that implements a motion (movement) in the vertical direction and the second motor 22 (servo motor) that implements a motion (movement) in the horizontal direction, the position of the holding member 12 can be calculated as the instruction position or the instruction angle of each motor with respect to the elapsed time. Note that the first motor 20 and the second motor 22 (servo motors) can detect the position of the holding member 12 by counting the output pulse of an encoder 21 or 23.

A modification of the servo transfer feeder 10 according to one embodiment of the present disclosure is described below with reference to FIGS. 7 and 8.

Figure 7:
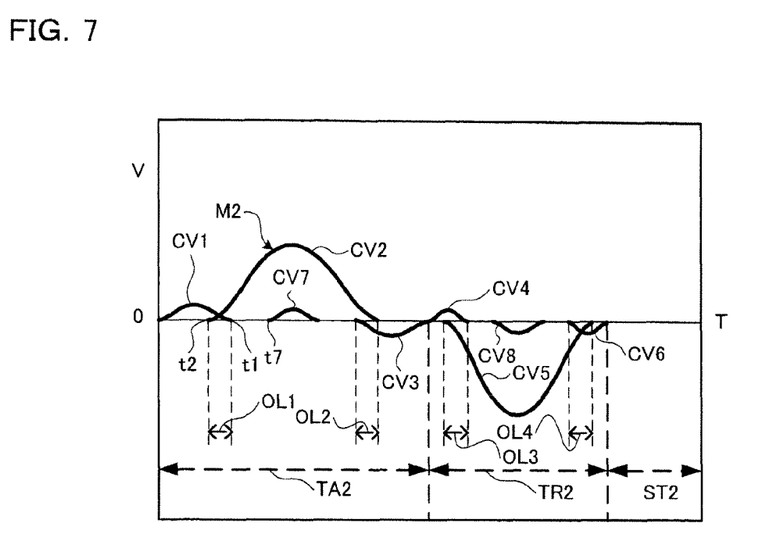
FIG. 7 illustrates a transfer motion generated by a servo transfer feeder according to one embodiment of the present disclosure.

FIG. 7 illustrates a transfer motion M2 that is generated by the servo transfer feeder 10 according to one embodiment of the present disclosure. FIG. 8 illustrates a motion path R2 of the holding member 12 that is transferred by the servo transfer feeder 10 according to one embodiment of the present disclosure. Note that the first motion cam curve CV1, the second motion cam curve CV2, the third motion cam curve CV3, the fourth motion cam curve CV4, the fifth motion cam curve CV5, and the sixth motion cam curve CV6 illustrated in FIG. 7 are the same as those illustrated in FIG. 5.

Figure 8:
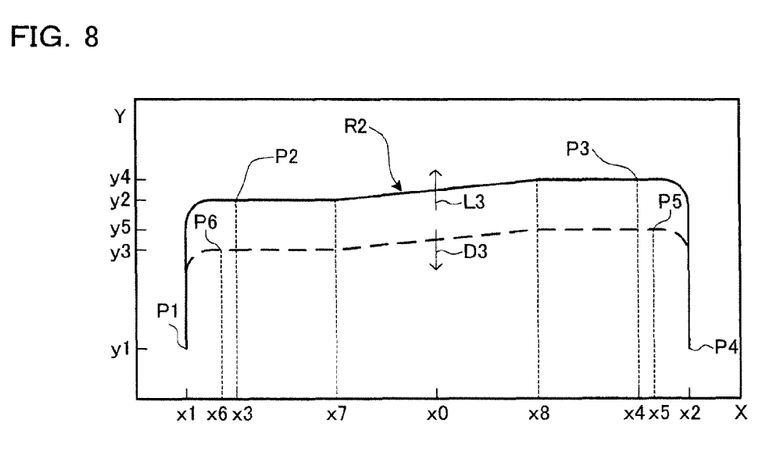
FIG. 8 illustrates the motion path of a holding member transferred by a servo transfer feeder according to one embodiment of the present disclosure.

The modification illustrated in FIGS. 7 and 8 differs from the embodiment illustrated in FIGS. 5 and 6 in that the transfer motion M2 is generated so that the adjacent motion cam curves overlap each other, and a third lift motion L3 is additionally provided. Specifically, the transfer motion generation section 452 may include the lap setting section 453 that sets overlapping times OL1, OL2, OL3, and OL4 when combining the motion cam curves CV1, CV2, CV3, CV4, CV5, and CV6 of the respective motions by setting the motion start time and the motion end time of the adjacent motion cam curves so that the motion start time of the subsequent motion cam curve is earlier than the motion end time of the preceding motion cam curve.

As illustrated in FIG. 7, the overlapping time OL1 may be set by setting the motion start time t2 of the second motion cam curve CV2 (i.e., subsequent motion cam curve) to be earlier than the motion end time t1 of the first motion cam curve CV1 (i.e., preceding motion cam curve), for example. When the lap setting section 453 thus sets the overlapping times OL1, OL2, OL3, and OL4, the advance time is reduced from TA1 to TA2, the return time is reduced from TR1 to TR2, and one cycle time is reduced by ST2 (i.e., the sum of the overlapping times). Specifically, the operator inputs the overlapping times OL1, OL2, OL3, and OL4 for the transfer motion M1 from the motion condition input section 76 using the control device 4, and the lap setting section 453 generates the transfer motion M2.

The transfer motion M2 is generated so that the adjacent motions are connected to draw a curve when the motion path R2 of the holding member 12 is expressed using a horizontal direction (X)-vertical direction (Y) coordinate system (see FIG. 8). In this case, it is desirable to set the overlapping times so that the holding member 12 passes through the second position P2, the third position P3, the fifth position P5, and the sixth position P6. Specifically, when the height of the lower die 7B differs from the height of the lower die 7A, it may be necessary to move the holding member 12 in the vertical direction in the non-interference area between the second position P2 and the third position P3, and the non-interference area between the fifth position P5 and the sixth position P6, for example.

Although the moving direction of the holding member 12 is not illustrated in FIG. 7 that utilizes the time (T)-velocity (V) coordinate system, the motion in the vertical direction and the motion in the horizontal direction are alternately combined as described with reference to FIGS. 5 and 6.

According to the servo transfer feeder 10 that sets the overlapping time, it is possible to generate the transfer motion M2 that is reduced in cycle time as compared with the transfer motion M1 without changing the first motion cam curve CV1, the second motion cam curve CV2, the third motion cam curve CV3, the fourth motion cam curve CV4, the fifth motion cam curve CV5, and the sixth motion cam curve CV6. Since the motion cam curve of each motion is used directly, it is possible to generate the transfer motion M2 that is reduced in cycle time without adversely affecting workpiece transfer. Moreover, since the motion end time and the motion start time of the adjacent motion cam curves are merely made to overlap, it is comprehensible for the operator, and the setting operation is facilitated.

As illustrated in FIG. 8, the servo transfer feeder 10 according to the modification may be configured so that the holding member 12 further performs the third lift motion L3 during the advance motion AD.

In this case, the motion condition input section 76 also sets a motion start position x7 or a motion start time t7 and the moving distance (i.e., the distance between x7 and x8) of the third lift motion L3, and the cam curve generation section 451 inputs the motion start position x7 or the motion start time t7 and the moving distance (i.e., the distance between x7 and x8) set by the motion condition input section 76 to the basic cam curve to generate a motion cam curve CV7 of the third lift motion L3. The moving distance of the holding member 12 during the third lift motion L3 is y4-y2.

This makes it possible to easily set the third lift motion L3 of the holding member 12 during the advance motion AD by combining the motion cam curve CV7.

As illustrated in FIGS. 7 and 8, a third down motion D3 may also be provided during the return motion RT between the fifth position P5 and the sixth position P6. The moving distance of the holding member 12 during the third down motion D3 is y5-y3. It is possible to reduce the moving distance during the first lift motion L1 or the second down motion D2 in the upstream press 1A, and the first down motion D1 or the second lift motion L2 in the downstream press 1B by thus moving the holding member 12 upward/downward in the non-interference area, and generate the transfer motion M2 that is reduced in cycle time without adversely affecting workpiece transfer.

A method for controlling the servo transfer feeder 10 is described below with reference to FIGS. 2 and 9.

Figure 9:
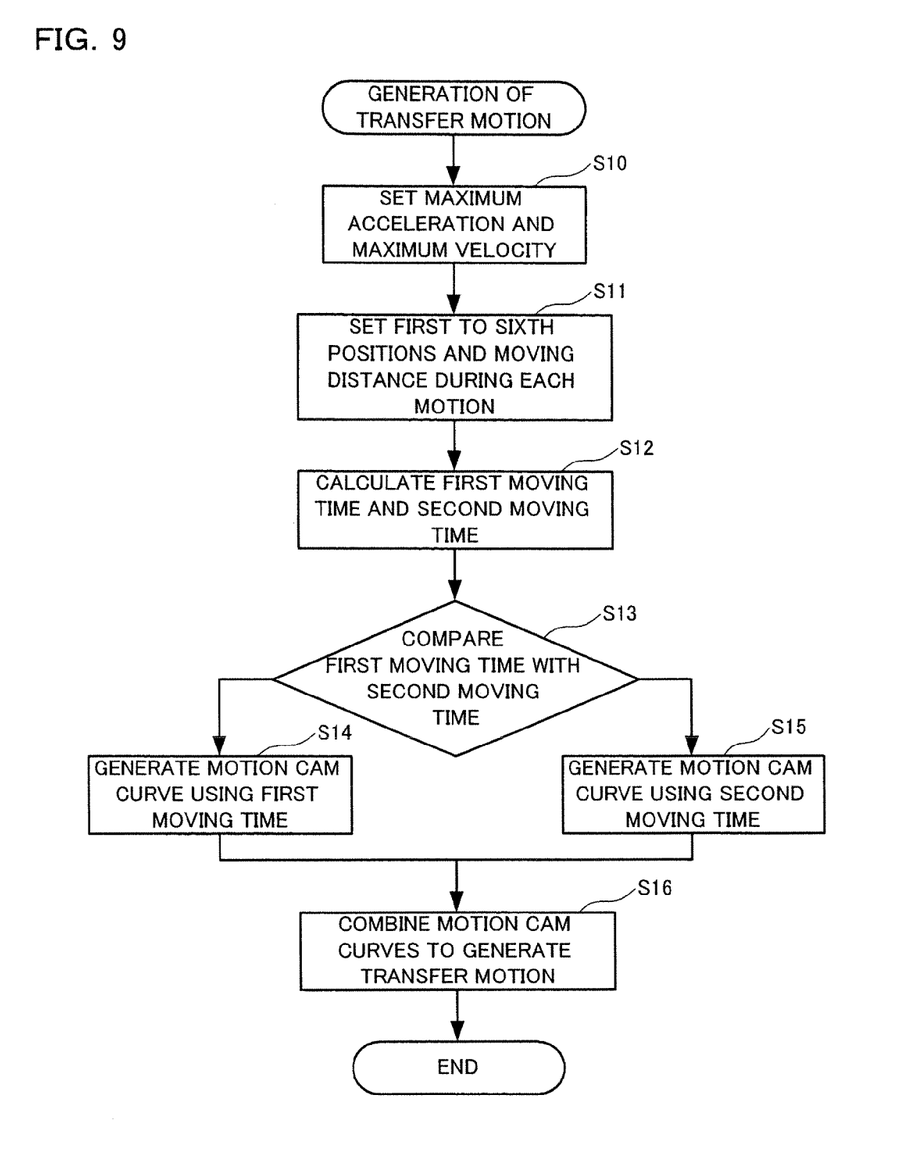
FIG. 9 is a flowchart illustrating a transfer motion generation process implemented using a servo transfer feeder according to one embodiment of the present disclosure.

FIG. 9 is a flowchart illustrating a process that generates the transfer motion M1 using the servo transfer feeder 10 according to one embodiment of the present disclosure.

The basic cam curve is stored in the reference cam curve storage section 460 in advance, the basic cam curve having been generated so that the moving time and the moving distance can be arbitrarily set, and the velocity and the acceleration of the holding member 12 at the starting point and the end point are 0. A plurality of basic cam curves may be provided, and one of the plurality of basic cam curves may be selected in advance.

In a step 1 (S10), the motion condition input section 76 sets the maximum velocity and the maximum acceleration as the motion limit values when the holding member 12 moves, and the maximum velocity and the maximum acceleration are stored in the maximum velocity/maximum acceleration storage section 462, for example.

In a step 2 (S11), the motion condition input section 76 sets the moving distance when the holding member 12 performs each motion among the first lift motion L1, the advance motion AD, the first down motion D1, the second lift motion L2, the return motion RT, and the second down motion D2.

In a step 3 (S12), the moving time calculation section 450 calculates the first moving time of each motion while limiting the basic cam curve at the moving distance of each motion set by the motion condition input section 76 using the maximum velocity, and calculates the second moving time of each motion while limiting the basic cam curve at the moving distance of each motion set by the motion condition input section 76 using the maximum acceleration.

In a step 4 (S13), the first moving time and the second moving time calculated by the moving time calculation section 450 are compared to select the first moving time or the second moving time, whichever is longer.

In a step 5 (S14) or a step 6 (S15), the selected moving time (first moving time or second moving time) and the moving distance of each motion are input to the basic cam curve to generate the motion cam curve of each motion.

In a step 7 (S16), the transfer motion generation section 452 combines at least six motion cam curves generated in the step 5 or the step 6 to generate the transfer motion. The transfer motion thus generated is stored in the transfer motion storage section 464.

The servo transfer feeder 10 calculates the position instruction (i.e., servo motor instruction value) using the motor instruction calculation section 454 based on the transfer motion stored in the transfer motion storage section 464, and outputs the position instruction to the servo driver 24 from the output section 455 to move the holding member 12 between the upstream press 1A and the downstream press 1B.

According to the method for controlling the servo transfer feeder, it is possible to stably transfer the workpiece during each motion by generating the motion cam curve corresponding to each motion. It is also possible to easily set the transfer motion by generating the motion cam curves corresponding to the six motions.

In the step 7 (S16), the lap setting section 453 may set the overlapping time when combining the motion cam curve of each motion (see the modification).

In the step 7 (S16) (or before or after generating the transfer motion in the step 7 (S16)), the cam curve generation section 451 may generate the motion cam curve of the third lift motion L3 (see the modification).

In the step 2 (S11), the first position P1, the second position P2, the third position P3, and the fourth position P4 through which the holding member 12 passes along the motion path in which the workpiece W is transferred from the upstream press 1A to the downstream press 1B, and the fifth position P5 and the sixth position P6 through which the holding member 12 passes along the motion path in which the holding member 12 is transferred from the downstream press 1B to the upstream press 1A, may be set in order to set the moving distance when the holding member 12 performs each motion.

In this case, since the motion path of the holding member 12 can be set by merely setting the first position P1, the second position P2, the third position P3, the fourth position P4, the fifth position P5, and the sixth position P6, the transfer motion setting operation can be facilitated.

The first position P1, the second position P2, the third position P3, the fourth position P4, the fifth position P5, and the sixth position P6 may be set using a virtual transfer feeder that is defined using a three-dimensional CAD virtual space. Three-dimensional shape data relating to the die that is installed or to be installed in the actual press line may be included in the three-dimensional CAD virtual space. It is possible to perform the transfer motion setting operation without stopping the operation of the press line by setting the position using a virtual transfer feeder that utilizes three-dimensional CAD. When the three-dimensional shape data relating to the die that is installed or to be installed in the actual press line is included in the three-dimensional CAD virtual space, it is possible to easily increase the overlapping time when combining the motion cam curve of each motion so that interference of the workpiece W or the holding member 12 with the lower die does not occur.

Although only some embodiments of the present disclosure have been described in detail above, those skilled in the art would readily appreciate that many modifications are possible in the embodiments without materially departing from the novel teachings and advantages of the invention. Accordingly, all such modifications are intended to be included within the scope of the invention.

What is claimed is:

1. A servo transfer feeder configured to transfer a workpiece between an upstream press and a downstream press, the workpiece being held by a holding member, the servo transfer feeder comprising:
a storage section that stores a basic cam curve, a maximum velocity, and a maximum acceleration, the basic cam curve having been generated so that a moving time and a moving distance can be arbitrarily set, and a velocity and an acceleration of the holding member at a starting point and an end point are 0, and the maximum velocity and the maximum acceleration being set as motion limit values when the holding member moves;
a motion condition input section that sets the moving distance when the holding member performs each motion among a first lift motion, an advance motion, a first down motion, a second lift motion, a return motion, and a second down motion;
a moving time calculation section that calculates a first moving time of each motion while limiting the basic cam curve at the moving distance of each motion set by the motion condition input section using the maximum velocity, and calculates a second moving time of each motion while limiting the basic cam curve at the moving distance of each motion set by the motion condition input section using the maximum acceleration;
a cam curve generation section that compares the first moving time with the second moving time to select the first moving time or the second moving time, whichever is longer, and inputs the selected moving time and the moving distance of each motion to the basic cam curve to generate a motion cam curve of each motion;
a transfer motion generation section that combines at least six motion cam curves that have been generated by the cam curve generation section to generate a transfer motion; and
an output section that outputs a position instruction relating to the holding member based on the transfer motion.

2. The servo transfer feeder as defined in claim 1,
wherein the transfer motion generation section includes a lap setting section that sets an overlapping time when combining the motion cam curve of each motion by setting a motion start time and a motion end time of adjacent motion cam curves so that the motion start time of a subsequent motion cam curve is earlier than the motion end time of a preceding motion cam curve.

3. The servo transfer feeder as defined in claim 1,
wherein the holding member further performs a third lift motion during the advance motion,
the motion condition input section also sets a motion start position or a motion start time and the moving distance of the third lift motion, and
the cam curve generation section inputs the motion start position or the motion start time and the moving distance set by the motion condition input section to the basic cam curve to generate a motion cam curve of the third lift motion.

4. The servo transfer feeder as defined in claim 1,
wherein the motion condition input section sets a first position, a second position, a third position, and a fourth position through which the holding member passes along a motion path in which the workpiece is transferred from the upstream press to the downstream press, and sets a fifth position and a sixth position through which the holding member passes along a motion path in which the holding member is transferred from the downstream press to the upstream press, in order to set the moving distance when the holding member performs each motion,
the first position is a motion start position of the first lift motion, and a motion end position of the second down motion,
the second position is a position which is situated on a side of the upstream press and through which the holding member passes during the advance motion, and is situated at a height at which the workpiece does not interfere with a first lower die of the upstream press,
the third position is a position which is situated on a side of the downstream press and through which the holding member passes during the advance motion, and is situated at a height at which the workpiece does not interfere with a second lower die of the downstream press,
the fourth position is a motion end position of the first down motion, and a motion start position of the second lift motion,
the fifth position is a position which is situated on a side of the downstream press and through which the holding member passes during the return motion, and is situated at a height at which the holding member does not interfere with the second lower die, and
the sixth position is a position which is situated on a side of the upstream press and through which the holding member passes during the return motion, and is situated at a height at which the holding member does not interfere with the first lower die.

5. The servo transfer feeder as defined in claim 4,
wherein the first position is a position at which the holding member starts to hold the workpiece on the first lower die,
the second position is a position of the holding member when an end of the workpiece that is situated on a side of the upstream press overlaps an end of the first lower die that is situated on a side of the downstream press in a plan view,
the third position is a position of the holding member when an end of the workpiece that is situated on a side of the downstream press overlaps an end of the second lower die that is situated on a side of the upstream press in a plan view,
the fourth position is a position at which the holding member releases the workpiece on the second lower die,
the fifth position is a position of the holding member when an end of the holding member that is situated on a side of the downstream press overlaps an end of the second lower die that is situated on a side of the upstream press in a plan view, and
the sixth position is a position of the holding member when an end of the holding member that is situated on a side of the upstream press overlaps an end of the first lower die that is situated on the side of the downstream press in a plan view.

6. A method for controlling a servo transfer feeder configured to transfer a workpiece between an upstream press and a downstream press, the workpiece being held by a holding member, the method comprising:
providing a basic cam curve, a maximum velocity, and a maximum acceleration, the basic cam curve having been generated so that a moving time and a moving distance can be arbitrarily set, and a velocity and an acceleration of the holding member at a starting point and an end point are 0, and the maximum velocity and the maximum acceleration being set as motion limit values when the holding member moves;

setting the moving distance when the holding member performs each motion among a first lift motion, an advance motion, a first down motion, a second lift motion, a return motion, and a second down motion;

calculating a first moving time of each motion while limiting the basic cam curve at the set moving distance of each motion using the maximum velocity;

calculating a second moving time of each motion while limiting the basic cam curve at the set moving distance of each motion using the maximum acceleration;

comparing the first moving time with the second moving time to select the first moving time or the second moving time, whichever is longer, and inputting the selected moving time and the moving distance of each motion to the basic cam curve to generate a motion cam curve of each motion;

combining at least six motion cam curves that have been generated to generate a transfer motion; and outputting a position instruction based on the transfer motion to move the holding member between the upstream press and the downstream press.

7. The method as defined in claim 6, further comprising:

setting an overlapping time when combining the motion cam curve of each motion by setting a motion start time and a motion end time of adjacent motion cam curves so that the motion start time of a subsequent motion cam curve is earlier than the motion end time of a preceding motion cam curve.

8. The method as defined in claim 6, wherein the holding member further performs a third lift motion during the advance motion, the method further comprising:

setting a motion start position or a motion start time and the moving distance of the third lift motion; and inputting the motion start position or the motion start time and the moving distance that have been set to the basic cam curve to generate a motion cam curve of the third lift motion.

9. The method as defined in claim 6, further comprising:

setting a first position, a second position, a third position, and a fourth position through which the holding member passes along a motion path in which the workpiece is transferred from the upstream press to the downstream press, and setting a fifth position and a sixth position through which the holding member passes along a motion path in which the holding member is transferred from the downstream press to the upstream press, in order to set the moving distance when the holding member performs each motion, wherein the first position is a motion start position of the first lift motion, and a motion end position of the second down motion, the second position is a position which is situated on a side of the upstream press and through which the holding member passes during the advance motion, and is situated at a height at which the workpiece does not interfere with a first lower die of the upstream press, the third position is a position which is situated on a side of the downstream press and through which the holding member passes during the advance motion, and is situated at a height at which the workpiece does not interfere with a second lower die of the downstream press, the fourth position is a motion end position of the first down motion, and a motion start position of the second lift motion, the fifth position is a position which is situated on a side of the downstream press and through which the holding member passes during the return motion, and is situated at a height at which the holding member does not interfere with the second lower die, and the sixth position is a position which is situated on a side of the upstream press and through which the holding member passes during the return motion, and is situated at a height at which the holding member does not interfere with the first lower die.

10. The method as defined in claim 9, wherein the first position is a position at which the holding member starts to hold the workpiece on the first lower die, the second position is a position of the holding member when an end of the workpiece that is situated on a side of the upstream press overlaps an end of the first lower die that is situated on a side of the downstream press in a plan view, the third position is a position of the holding member when an end of the workpiece that is situated on a side of the downstream press overlaps an end of the second lower die that is situated on a side of the upstream press in a plan view, the fourth position is a position at which the holding member releases the workpiece on the second lower die, the fifth position is a position of the holding member when an end of the holding member that is situated on a side of the downstream press overlaps an end of the second lower die that is situated on a side of the upstream press in a plan view, and the sixth position is a position of the holding member when an end of the holding member that is situated on a side of the upstream press overlaps an end of the first lower die that is situated on the side of the downstream press in a plan view.

11. The method as defined in claim 9, wherein the first position, the second position, the third position, the fourth position, the fifth position, and the sixth position are set using a virtual transfer feeder that is defined using a three-dimensional CAD virtual space.

12. A servo transfer feeder configured to transfer a workpiece between an upstream press and a downstream press, the workpiece being held by a holding member, the servo transfer feeder comprising:

a storage section that stores a basic cam curve, a maximum velocity and a maximum acceleration, the basic cam curve being generated by arbitrarily setting a moving time and a moving distance of the holding member, and the maximum velocity and the maximum acceleration being set as motion limit values when the holding member moves;

a moving time calculation section that respectively calculates different moving times as to the moving distance of the holding member by limiting the basic cam curve respectively to the maximum velocity and the maximum acceleration; and a cam curve generation section that generates a motion cam curve as to the holding member by reflecting the moving distance and a longer one of the different moving times to the basic cam curve, wherein the holding member moves between the upstream press and the downstream press, based on the motion cam curve.

13. The servo transfer feeder as defined in claim 12, wherein the basic cam curve does not exceed the maximum velocity and the maximum acceleration while the longer one of the different moving times is calculated.

14. The servo transfer feeder as defined in claim 12, wherein a first motion path along which the holding member moves from the upstream press to the downstream press is above a second motion path along which the holding member moves from the downstream press to the upstream press.

15. The servo transfer feeder as defines in claim 14, wherein the holding member holds the workpiece when the holding member moves along the first motion path and the holding member does not hold the workpiece when the holding member moves along the second motion path.

16. The servo transfer feeder as defined in claim 14, wherein the holding member moves upward in the first motion path and moves downward in the second motion path.

* * * * *